United States Patent [19]
Fukuda

[11] Patent Number: 4,823,705
[45] Date of Patent: Apr. 25, 1989

[54] GOLF CART SYSTEM WITH EMBEDDED RAIL HAVING INCLINED SURFACES

[76] Inventor: Tomiichi Fukuda, 3-23-18, Denenchofu, Ota-ku, Tokyo, Japan

[21] Appl. No.: 756,693

[22] Filed: Jul. 19, 1985

[30] Foreign Application Priority Data

| | | | |
|---|---|---|---|
| Jul. 26, 1984 | [JP] | Japan | 59-155915 |
| Dec. 27, 1984 | [JP] | Japan | 59-275452 |
| Mar. 8, 1985 | [JP] | Japan | 60-47007 |

[51] Int. Cl.⁴ ........ B61B 13/10; B61F 13/00
[52] U.S. Cl. ........ 104/140; 104/118
[58] Field of Search ........ 104/140, 139, 108, 109, 104/107, 118

[56] References Cited

U.S. PATENT DOCUMENTS

| | | | |
|---|---|---|---|
| 432,204 | 7/1890 | McLaughlin | 104/139 |
| 841,821 | 1/1907 | Smead | 104/140 |
| 923,337 | 6/1909 | Cowley | 104/107 |
| 1,038,504 | 9/1912 | Smith | 104/139 |
| 1,133,623 | 3/1915 | Dreifuss | 104/139 X |
| 3,838,648 | 10/1974 | Daulberg et al. | 104/140 X |
| 3,854,406 | 12/1974 | Monne | 104/108 X |
| 3,859,925 | 1/1975 | Hartz | 104/140 X |

*Primary Examiner*—Robert B. Reeves
*Assistant Examiner*—Joseph D. Pape
*Attorney, Agent, or Firm*—Wenderoth, Lind & Ponack

[57] ABSTRACT

A golf cart system includes a longitudinal rail having a transverse cross section defined by spaced side walls joined at lower ends thereof by a bottom wall having an inner upper surface. The side walls have at upper ends thereof upper walls extending inwardly toward each other and having inner lower surfaces. The upper walls have spaced inner edges having extending upwardly therefrom mouth portions. The inner edges and the mouth portions define therebetween a longitudinal groove opening downwardly into the interior of the rail. The rail is embedded in the ground of a golf course with upper edges of the mouth portions substantially flush with the ground surface. A golf cart is movable along the rail and has support structure extending downwardly therefrom through the longitudinal groove of the rail. Wheels are mounted on the support structure within the rail interior and contact the inner upper surface of the rail bottom wall. The cart supports a drive to rotate the wheels to move the cart along the rail. The cart is prevented from falling sideways from the rail by rollers supported by the cart and positioned within the rail interior and contacting the inner lower surfaces of the rail upper walls.

13 Claims, 6 Drawing Sheets 30
31
6
b
13
23
3'
23'
5
27'
2"
28
27'
33
17'
34
34
a"
21'
26
25
26
28
31
14'
14'
24'
25'
24
4'
1

105
103
123
103a
120
108
103
102a
108
102
102
110
102a
101
101
104a
109
104
107

104a
109
107
104a
110
109
105
103a
103a
123

GOLF CART SYSTEM WITH EMBEDDED RAIL HAVING INCLINED SURFACES

BACKGROUND OF THE INVENTION

The present invention relates to a golf cart for propelling around a golf course a golf cart or caddy cart of the type for carrying golf clubs, bags and other articles.

More particularly, the present invention is directed to such a system and to a rail thereof for enabling the passage around the terrain of a golf course of the golf cart running on the rail buried in the ground and extending through selected locations of the golf course, the upper surface of the rail being flush with the ground surface, and the golf cart and rail having cooperating structure for preventing the golf cart from turning over sideways or slipping from the rail.

There are known caddy carts provided with at least three wheels arranged in front and rear, and such carts can be moved over a golf course stably without turning over sideways. However, there is no known two-wheeled cart having, similar to a bicycle, a front wheel and a rear wheel, which can be moved along a narrow path on the fairways of a golf course without damaging the grass or turning over sideways.

There has been proposed a mono-rail type of caddy cart system wherein a rail is provided above the ground or in a wide trench (for example 25 cm wide) formed in the ground. It also has been proposed to form such rail of U-shaped channel members embedded in the ground. In such case however, a large width of the mono-rail is exposed above ground, such that golf balls often bounce irregularly therefrom and are lost. In addition, it is necessary to locate the rail in the rough areas of the golf course some distance from the fairways, since the rail detracts from the appearance of the landscape or scenery of the fairways. Accordingly, a caddy or player has to walk substantial distances between the cart and the position of a golf ball, thus wasting time and energy. In order to avoid such problems, a player might be tempted to use an unsuitable club, thereby effecting his score and detracting from enjoyment of the game. Such system also extends the time required for a round of golf and thereby restricts the number of players allowed to employ the golf course. Even further, if a golf ball lands close to the rail, when such golf ball next is hit it could rebound from the rail above the ground or on the ground, which is dangerous to the players, or the player might be obliged to take a "drop". Such occurrences are inconvenient to the progress of the game. Additionally, a rail above the ground or a wide rail embedded in the ground are incompatible with the natural scenery of a golf course. In order to overcome these problems, such rails must be positioned far from the fairways, and preferably be hidden by trees or bushes.

The carts usually are driven electrically and are heavy (for example about 85 kg), and an operator for controlling the cart is required. The cart therefore seriously damages the grass so that it is necessary to construct a paved lane of concrete or asphalt, for example of about 1.5 m width, for such electrically driven carts. Such lanes or paths must also be located far from the fairways, for example between 50 to 100 m, which again raises the problems of wasted time and energy. In addition, it often occurs that a golf ball hitting such lane or path will rebound in an unexpected direction, whereby it becomes lost or out of bounds, thereby seriously impairing the players enjoyment of the game.

A newly developed caddy cart propelling system recently has been proposed, whereby an electromagnetic induction type caddy cart (having the brand name "Green Boy" or "High Cart Carry") is employed. This system has an electromagnetic cable buried in a paved lane (about 1.5 m wide) on which the cart runs, and a sensor for detecting a magnetic field generated by such cable and determining direction of movement, whereby the cart runs in an unattended manner by remote control means. In this system, the same drawbacks as are discussed above are encountered.

The known, old fashioned two-wheeled cart having left and right wheels and supported by hand is free from the above problems. This type of cart does not turn over sideways and does not damage the grass because it is not heavy. This type of caddy cart therefore still is popular on golf courses which are comparatively flat. Also known are similar types of caddy carts capable of carrying plural bags, for example four bags. Such arrangements particularly are employed at golf courses having a shortage of caddies. However, the weight of four bags is approximately 45 kg, and the total loaded weight including the cart easily can reach 65 kg. Therefore, a considerable amount of effort is required even on flat ground to convey such carts, and the wheels of the cart become heavily loaded and can damage the grass of the golf course. Play often is interrupted by delays in the arrival of the cart, particularly when the cart must be pushed up a slope, and when the caddies must provide additional services such as replacing or covering divets and smoothing bunkers. Most golf courses have many slopes, and therefore it is hard work for the caddies to accompany the players while handling caddy carts carrying golf clubs and other articles. As a result, play often is prolonged, and this impairs the enjoyment of the game.

The most important concern for a golf course is to reduce damage to the grass which has a vital impact on the playing of the game. Hence, the ultimate demand is for minimization of damage to the grass. Unfortunately however, existing automatic transportation systems, which otherwise would minimize damage to the grass, have drawbacks as mentioned above and therefore are not generally employed.

To overcome various of the above disadvantages the present inventor previously has proposed a golf cart system wherein a rail is embedded in the ground along fairway portions of a golf course, and whereby a cart is movable automatically along such rail. The cart includes wheels rolling on upper surface portions of the rail, and the system also includes structure for preventing the cart from falling over from the rail. In such arrangement, the rail provides running surfaces of a width of at least 20 mm. Therefore, it is necessary to form the rail to have a U-shaped configuration with an upper gap or groove, through which pass vertical shafts from the golf cart, of a width of at least 30 mm. Thus, the upper exposed portion of the rail has a total width of at least 70 mm, and there still is difficulty in concealing such a rail, even when the exposed portions thereof are covered with artificial turf-like members. Thus, there still exists the problem that golfers notice and are distracted by such system. Additionally, when the cart moves along the rail, the weight of the cart and the golf clubs and other articles carried thereby is borne by the upper running portions of the rail on which run the wheels of the cart. As a result, it is necessary that the entire rail be constructed of sufficient strength to support the total load imposed thereon. That is, to make the upper, flange-like portions of the rail sufficiently strong to support the weight of the cart, the remaining portions of the rail must be similarly constructed. This results in relatively increased dimensions and weight of the rail, with the resultant difficulties of handling and increased costs of manufacture.

SUMMARY OF THE INVENTION

With the above discussion in mind, it is an object of the present invention to provide a system for automatically propelling golf carts of the caddy type around a golf course, while avoiding damage to the grass and at the same time overcoming the above discussed and other disadvantages of presently known and prior art systems.

It is a further object of the present invention to provide such a system and a rail therefor whereby the smallest possible rail surface is exposed above ground, whereby the rail thereby can be embedded along a golf course without impairing the appearance and scenery thereof.

It is a further object of the present invention to provide such a system and rail of a structure such that when a golf ball strikes the rail it will bounce therefrom substantially in the same manner as a ball contacting natural grass.

It is a still further object of the present invention to provide such a system and rail whereby the rail may be of reduced dimension and weight compared with known systems, while being constructed in a manner to satisfactorily bear the weight of the golf cart.

The above and other objects of the present invention are achieved by the provision of a cart operating or propelling system including a rail buried in the ground of a golf course to extend through selected locations thereof, including the fairways. The rail has a transverse cross section defined by spaced side walls joined at lower ends thereof by a bottom wall having an inner upper surface, the sidewalls having at upper ends thereof upper walls extending inwardly toward each other and having inner lower surfaces, the upper walls having spaced inner edges having extending upwardly therefrom mouth portions, the inner edges and the mouth portions defining therebetween a longitudinal groove opening downwardly into the interior of the rail. The rail is embedded in the ground of a golf course with upper edges of the mouth portion substantially flush with the ground surface. This system also includes a golf cart to be moved along the rail. Support means are mounted on the golf cart and extend downwardly therefrom through the longitudinal groove. Wheels are mounted on the support means within the rail interior and contact the inner upper surface of the rail bottom wall. The cart supports means for rotating at least some of the wheels and thereby for moving the cart along the rail. The system still further includes structure for preventing the cart from falling sideways from the rail, such structure including rollers supported by the cart and positioned within the rail interior and contacting the inner lower surfaces of the rail upper walls.

The rail is formed of a plurality of channel members which are formed integrally or are connected together when embedded in the ground.

The width of the groove is sufficiently small to prevent a golf ball from passing therethrough, and may be as small as approximately 30 to 35 mm. Since the weight of the cart is supported by the bottom wall of the rail, other portions of the rail, and particularly the mouth portions thereof, can be of small size, i.e. having a thickness of as little as 4 to 5 mm. Thus, the width of the total exposed surface of the rail including the groove may be as small as approximately 40 mm, i.e. approximately equal to the diameter of a golf ball. The total width of the rail portion which is buried in the ground may be as large as approximately 130 mm.

The upper surfaces of the rail which are exposed above the ground may be covered by flexible cosmetic members made of material such as rubber sheets or artificial turf of almost the same color, flexibility and elasticity as real grass. One side of each such flexible cosmetic member may be attached to the respective mouth portion of the rail so that the cosmetic members slightly overlap along the longitudinal rail groove. When the cart runs over the exposed portion of the rail, a vertical shaft attached to the cart separates the flexible cosmetic members laterally. At other times, the flexible cosmetic members overlap and close the top of the groove to prevent water, sand, soil and other foreign matter from entering the interior of the rail. The flexible cosmetic members have an appearance similar to that of real grass so that the presence of the rail does not detract from the appearance of the golf course, even when the rail extends through the fairways. Further, even if a golf ball hits the rail, it will not bounce irregularly. The rollers which prevent lateral falling of the cart are biased upwardly into contact with the inner lower surfaces of the rail upper walls.

There additionally may be provided guide means for contacting vertical surfaces of the rail to ensure smooth running of the cart and to further prevent falling or tipping of the cart. Such guide means may comprise guide rollers supported by the rollers and contacting inner surfaces of the side walls, at least one guide roller supported by the cart and contacting inner surfaces of the mouth portions, at least one guide roller supported by the support means and contacting surfaces of recesses formed in the mouth portions, circumferential flanges extending radially outwardly from the rollers and contacting surfaces of stepped recesses formed in the inner edges of the rail upper walls, or circumferential flanges extending radially outwardly from the wheels and contacting surfaces of a stepped recess formed in the inner upper surface of the rail bottom wall.

The inner upper surface of the rail bottom wall may be horizontal or may be defined by two inwardly and downwardly convergent inclined surfaces Also, the inner lower surfaces of the rail upper walls may be horizontal or may be inwardly and upwardly convergent inclined surfaces. The wheels and rollers have respective complementary horizontal or inclined running surfaces.

The support means may comprise at least one vertical shaft. The wheels may be rotatably mounted at a lower end of the vertical shaft, and an arm may be pivoted at a first end thereof to the lower end of the vertical shaft and support the rollers at a second end. A spring may bias the arm to pivot upwardly about the first end thereof to urge the rollers upwardly into contact with the inner lower surfaces of the rail upper walls. The vertical shaft may be hollow, whereby the rotating means includes a motor mounted on the cart and a transmission system operatively connecting the motor and the wheels and partially positioned within the hollow vertical shaft.

In accordance with another arrangement of the present invention the support means also includes a frame mounted on the vertical shaft. The wheels are rotatably mounted on the frame, and the rollers are mounted on a boss which is slidably mounted on the vertical shaft. A spring biases the boss upwardly along the vertical shaft with respect to the frame and thereby urges the rollers upwardly into contact with the inner lower surfaces of the rail upper walls, while at the same time the wheels are urged downwardly into contact with the inner upper surface of the bottom wall. The wheels are mounted on the frame at positions forwardly and rearwardly of the rollers with respect to the longitudinal direction of the rail, and the rotating means comprises a motor mounted on the cart and a transmission system operatively connecting the motor and the wheels.

In accordance with an even further arrangement of the present invention, the support means comprises a connecting shaft mounted at an upper end thereof to the cart, a supporting shaft pivoted at an upper end thereof to a lower end of the connecting shaft, a frame mounted on the supporting shaft and rotatably supporting the wheels, a boss slidably mounted on the supporting shaft and rotatably supporting the rollers, and a spring for biasing the boss upwardly along the supporting shaft with respect to the frame and therefore by urging the rollers upwardly into contact with the inner lower surfaces of the rail upper walls, while at the same time the wheels are urged downwardly into contact with the inner upper surface of the lower wall. The wheels are mounted on the frame at positions forwardly and rearwardly of the rollers with respect to the longitudinal direction of the rail, and the rotating means comprises a motor mounted on the cart and a transmission system operatively connecting the motor and the wheels. In this arrangement of the present invention the first-mentioned support means and the rollers and wheels supported thereby are located adjacent a first longitudinal end of the cart. This arrangement further comprises means for turnably mounting freely rotatable other wheels adjacent a second longitudinal end of the cart. Such mounting means comprises a second connecting shaft, means for supporting an upper end of the second connecting shaft on the cart for rotation about the axis of the second connecting shaft, a second supporting shaft pivoted at an upper end thereof to a lower end of the second connecting shaft, a second frame mounted on the second supporting shaft and rotatably supporting the freely rotatable wheels, a second boss slidably mounted on the second supporting shaft and rotatably supporting further rollers, and a second spring for biasing the second boss upwardly along the second supporting shaft with respect to the second frame and thereby for urging the further rollers upwardly into contact with the inner lower surfaces of the rail upper walls, while at the same time the freely rotatable rollers are urged downwardly into contact with the inner upper surface of the lower wall. During operation of this arrangement of the present invention, the rotating means rotates the first-mentioned wheels and thereby moves the cart along the rail, during which time contact between the rail and the freely rotatable wheels causes rotation of the freely rotatable wheels. In further accordance with this arrangement of the present invention, during movement of the cart along laterally curved portions of the rail, the rotatable support of the second connecting shaft on the cart enables turning of the second connecting shaft, the second supporting shaft, the second frame, the freely rotatable wheels, the second boss and the further rollers about the axis of the second connecting shaft with respect to the cart.

An additional aspect of the present invention provides a structural element for use in forming the rail to be implanted in the terrain of the golf course. Such structural element is in the form of a channel member having a transverse cross section defined by spaced side walls joined at lower ends thereby by a bottom wall, the side walls having at upper ends thereof upper walls extending inwardly toward each other, the upper walls having spaced inner edges having extending upwardly therefrom mouth portions, with the inner edges and the mouth portions defining therebetween a longitudinal groove. The bottom wall has an inner upper contour defined by two inwardly and downwardly convergent inclined surfaces, and the upper walls have inner lower contours defined by respective inwardly and upwardly convergent inclined surfaces. The inclined surfaces of the bottom and upper walls and inner surfaces of the side walls define within the channel member a longitudinal channel having a generally hexagonal transverse cross section which opens upwardly to the longitudinal groove. A longitudinal recess may be formed in the bottom wall between the two inclined surfaces thereof, the recess being defined by steps extending downwardly from respective of the inclined surfaces. As a result, water and debris such as sand and soil entering the channel may be collected in the recess. Furthermore, stepped recesses may be formed in the inner edges of the upper walls.

In accordance with the present invention, the entire weight of the cart is supported by the bottom wall of the rail. Additionally, the force of the tilting or falling prevention structure is borne by the upper walls. These are the only portions of the rail which have to be formed of relatively thick material, and these walls do not add to the width dimensions of the rail. Rather, the side walls and the mouth portions of the rail may be formed of relatively thin material, thereby enabling a reduction of the width of the rail, and more specifically a reduction in the width of that portion of the rail exposed above the ground.

BRIEF DESCRIPTION OF THE DRAWINGS

The above and other objects, features and advantages of the invention will be apparent from the following detailed description of preferred embodiments thereof, with reference to the accompanying drawings, wherein.

DETAILED DESCRIPTION OF THE INVENTION

Figure 1:
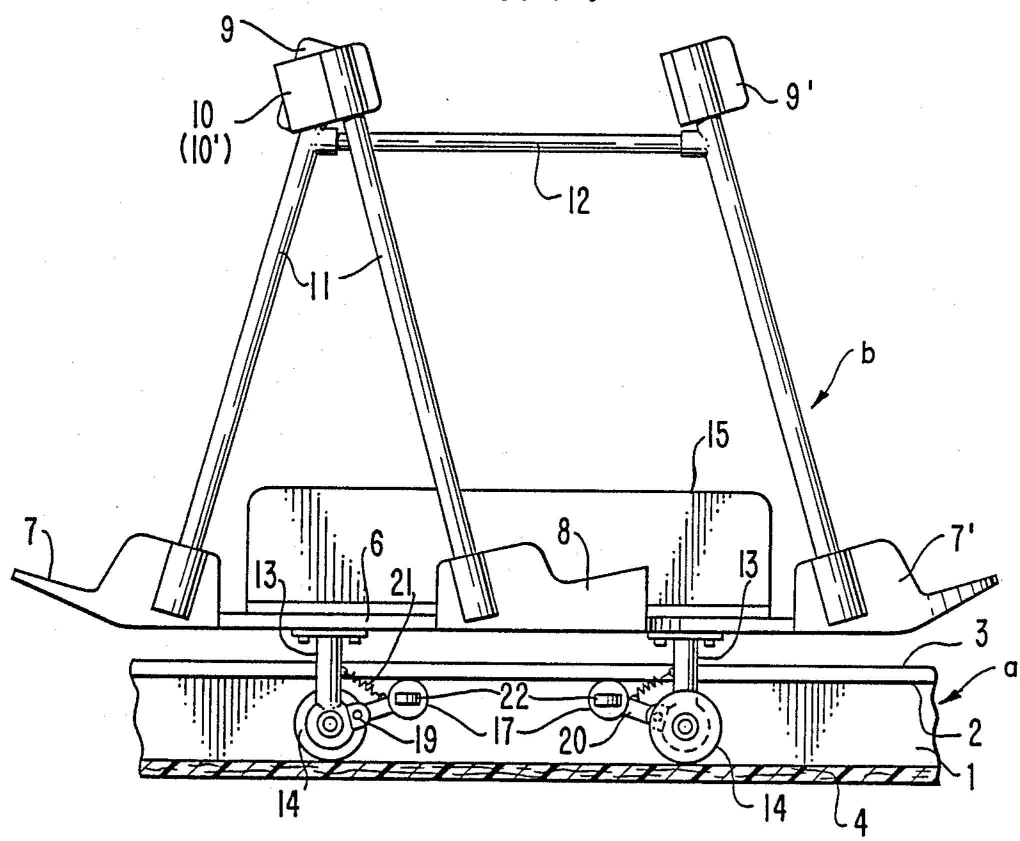
FIG. 1 is a somewhat schematic side elevation, partially in section, of a golf cart system according to a first embodiment of the present invention.
Figure 2:
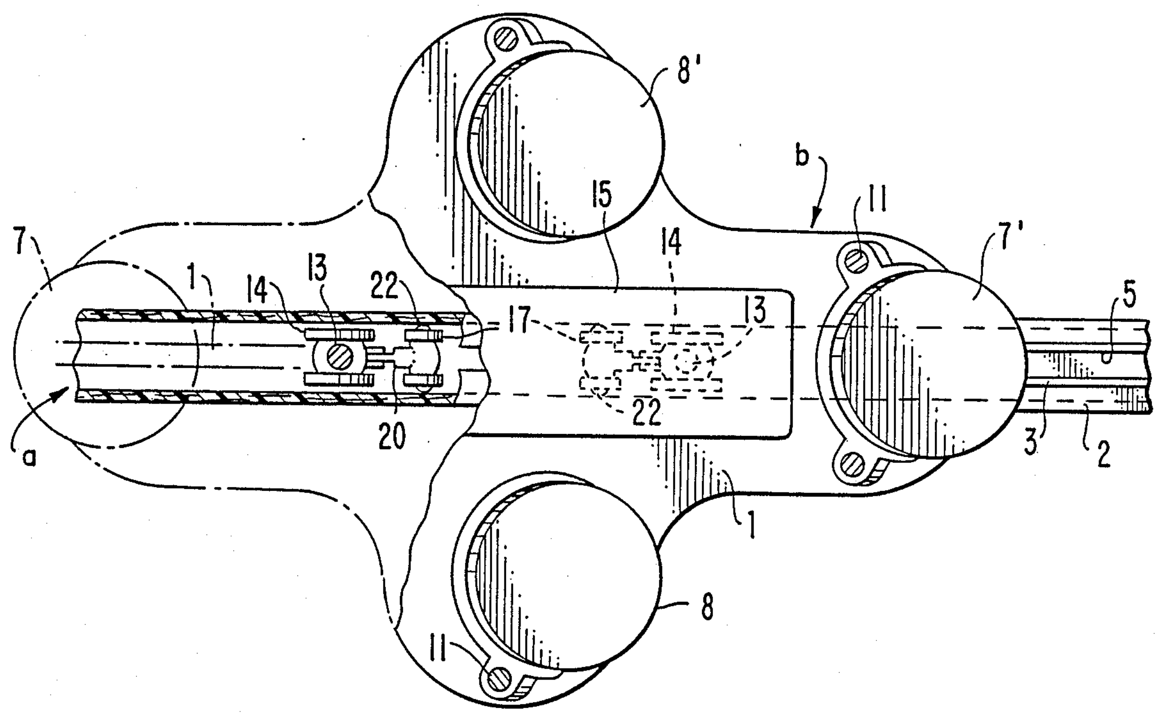
FIG. 2 is a plan view thereof, with portions broken away.

With reference to FIGS. 1–5, the first embodiment of the present invention now will be described. The system includes a rail a formed by a plurality of joined or integrally formed channel members. Longitudinal rail a has a transverse cross section defined by spaced side walls 1 joined at lower ends thereof by a bottom wall 4. The side walls 1 have at upper ends thereof upper walls 2 extending inwardly toward each other. The upper walls have spaced inner edges having extending upwardly therefrom mouth portions 3. The inner edges of upper walls 2 and mouth portions 3 define therebetween a longitudinal groove 5 which opens downwardly into the interior of rail a. Rail a is embedded in the ground of a golf course with the upper edges of mouth portions 3 substantially flush with the ground surface. In accordance with the present invention, as will be discussed in more detail below, substantially the entire weight of a golf cart is borne by lower wall 4 of the rail, and therefore wall 4 is formed of sufficient strength, for example of sufficient thickness, to bear such weight. Also, upper walls 2 operate, in a manner to be described in more detail below, to bear the force of structure to prevent the cart from falling over sideways with respect to the rail. Accordingly, upper walls 2 should be of sufficient strength, for example sufficient thickness, to achieve such function. However, all other portions of rail a may be formed of substantially reduced thickness, particularly when compared with previous arrangements, since they are not weight bearing. Side walls 1 and mouth portions 3 need merely be formed of sufficient thickness to maintain their form and shape, for example a thickness of 4 to 5 mm. As a result, the width of the portions of the rail a which are exposed to the ground surface, i.e. the width of the mouth portions 3 and the groove 5 therebetween, need not be more than approximately 40 mm. The rail may be formed of a suitable material A preferable construction of rail a is a mold of fiber reinforced plastic which is light and rigid and which has high resistance to weather conditions and corrosion.

Figure 3:
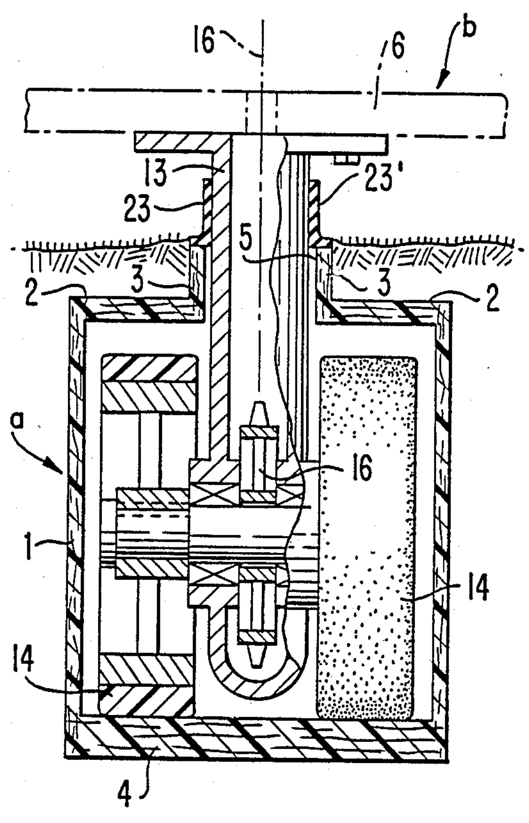
FIG. 3 is an enlarged transverse cross section thereof particularly showing driving wheels thereof.

Flexible cosmetic members or covers 23, 23′ of an elastic material and with color similar to that of real grass on the adjacent ground are attached to the exposed surfaces of mouth portions 3 so that free edges of members 23, 23′ slightly overlap at a position above the groove 5 to prevent soil, sand and rain water from entering the interior of the rail. Members 23, 23′ are formed of a material such as rubber plates, artificial turf or urethane. A golf or caddy cart b runs along the rail a and includes a body 6 having formed integrally therewith four inclined platforms 7, 7′, 8, 8′ at positions spaced 90° from each other. In the illustrated arrangement, the platforms are positioned at the front, rear and opposite lateral sides of body 6, thus forming a cruciform arrangement in the same plane. Positioned generally above each platform is a back support member 9, 9′, 10, 10′ forming a rest or stop for a respective golf bag. Each back support member is supported by posts 11 extending upwardly from body 6, and posts 11 are connected by stay members 12. At least the cart body 6 preferably is formed of molded fiber reinforced plastic. Fixed to and extending downwardly from front and rear portions of cart b are a pair of hollow vertical shafts 13 which extend downwardly through groove 5 into the interior of rail a. Rotatably supported at the lower end of each shaft 13 are a pair of wheels 14 which rest on the inner upper surface of bottom wall 4 of rail a. Thus, the entire weight of the cart b rests on the bottom wall 4. The configuration of the wheels and rotatable supports therefor are shown in FIG. 3. Wheels 14 are driven by a motor (not shown) which may be located in housing 15 located on body 6 of cart b, and by a transmission system 16 which may include sprocket wheels and drive chains, in a manner clearly apparent from the drawings. Such transmission system may drive one or both of the pairs of wheels 14 shown in FIG. 1, thereby resulting in movement of cart b along rail a.

In accordance with the present invention, there also is provided structure for preventing the golf cart from falling or slipping sideways from the rail. In the illustrated arrangement, this structure includes arrangements at the forward and rearward portions of the cart, in association with each pair of wheels 14. Each structure includes, as shown more clearly in FIGS. 4 and 5, a pair of rollers 17 which are urged upwardly into contact with the inner lower surfaces of upper walls 2. In one arrangement, rollers 17 are rotatably mounted at one end of an arm 20, the other end of which is pivoted with respect to shaft 13 about an axle 19. A spring 21 is connected between shaft 13 and arm 20 to urge rollers 17 upwardly. In further accordance with the present invention, there are provided guide rollers 22 for contacting vertical surfaces of rail a to ensure smooth running and to additionally facilitate prevention of tipping of the cart. As shown in FIG. 5, guide rollers 22 are rotatably mounted within respective rollers 17 to contact inner surfaces of side walls 1. Such contact ensures smooth guiding movement of the cart.

Figure 4:
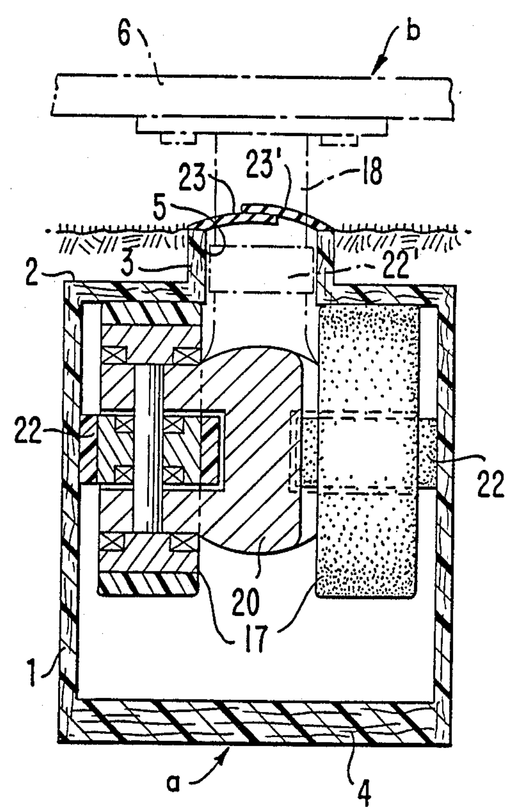
FIG. 4 is a section similar to FIG. 3 but particularly showing tipping preventing rollers thereof.
Figure 5:
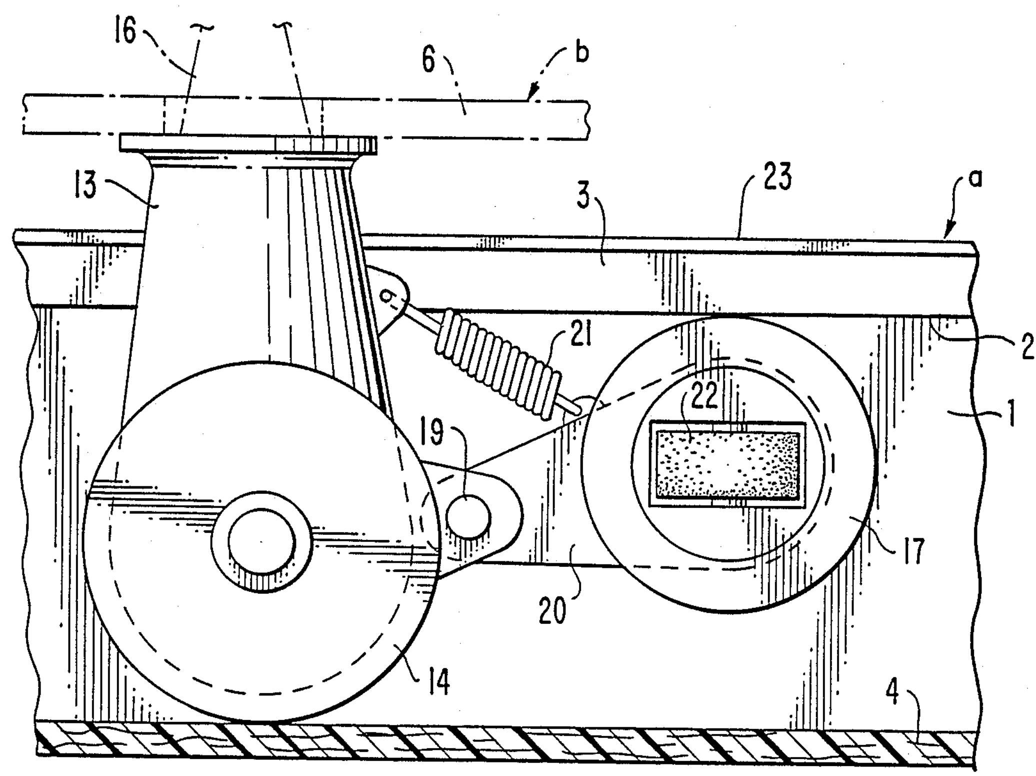
FIG. 5 is a partial side elevation, partly in section, thereof.

FIG. 4 illustrates in phantom lines an alternative arrangement for mounting of rollers 17. Thus, in this arrangement the rollers are mounted at the lower end of another shaft 18 fixed to cart b and extending downwardly through groove 5. In this arrangement also, guide rollers 22 may be replaced by a single guide roller 22′ rotatably mounted about shaft 18 to contact inner surfaces of mouth portions 3.

The spring 21 operates to resiliently press rollers 17 upwardly against the inner lower surfaces of upper walls 2 and also to contribute to pressing rollers 14 downwardly against the inner upper surface of bottom wall 4. This enables slipping of wheels 14 and rollers 17 to be minimized and the movement of the cart and the prevention of tipping of the cart to be achieved reliably.

Operation of the above system is believed to be apparent from the above discussion, but will be described briefly in the following. Thus, up to four golf bags may be placed on the respective platforms 7, 7′, 8, 8′ and rest against the respective back support members 9, 9′, 10, 10′, and may be fastened in such positions by suitable means. A motor (not shown) then is started to rotate wheels 14 via transmission system 16 such that cart b runs along rail a at a speed substantially equal to or slightly greater than the speed at which a golfer walks. When the cart rounds a curved portion of the rail, guide rollers 22, 22' contact the inner surfaces of side walls 1 or mouth portions 3 to maintain the cart running smoothly. When the cart b receives a tilting force due to the topography or terrain of the golf course, rollers 17 contact the inner lower surfaces of upper walls 2 to maintain the cart running safely and smoothly, thereby preventing the cart from turning sideways with respect to the rail. It will be understood that the driving motor of the cart can be stopped automatically at a predetermined position by a remote control or by a limit switch, as will be apparent to those skilled in the art. Cover members 23, 23' overlap to normally cover groove 5. However, as the cart moves along the rail, shafts 13 spread apart the cover members as shown particularly in FIG. 3.

Figure 6:
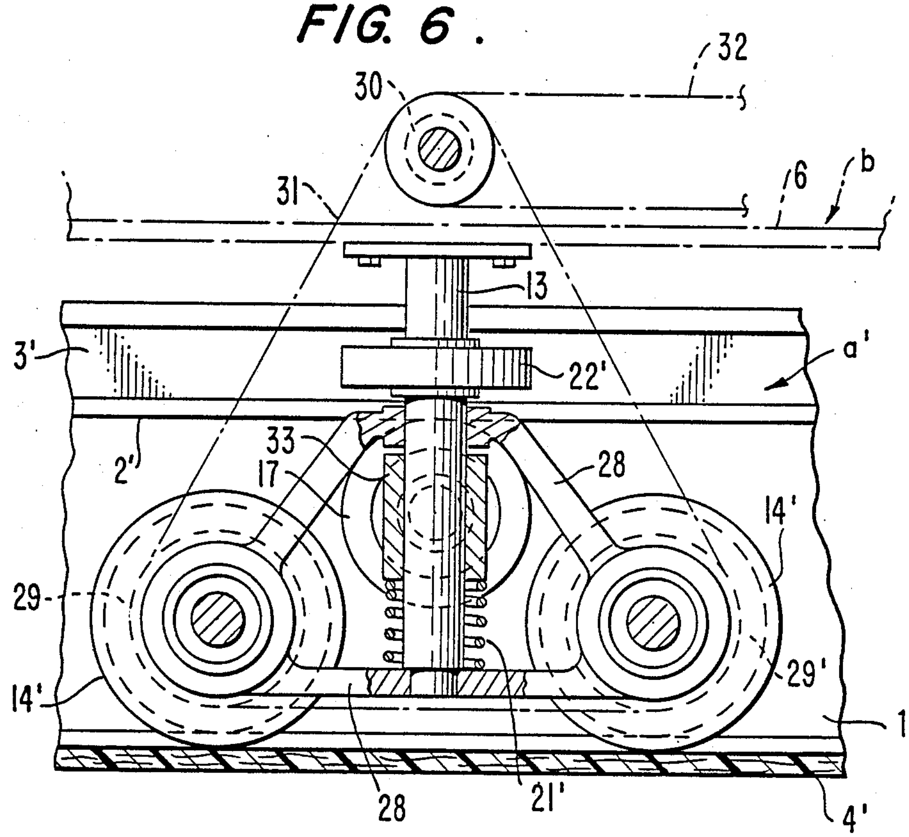
FIG. 6 is a view similar to FIG. 5 but of a second embodiment thereof.
Figure 7:
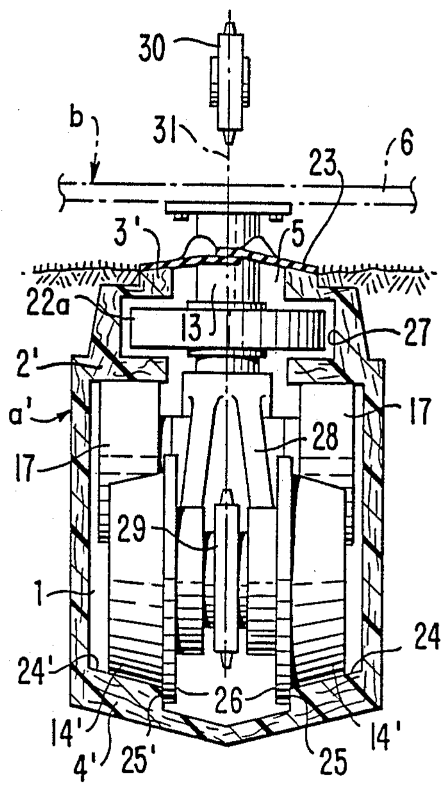
FIGS. 7 and 8 are transverse sections similar to FIGS. 3 and 4, respectively, but of the embodiment of FIG. 6.
Figure 8:
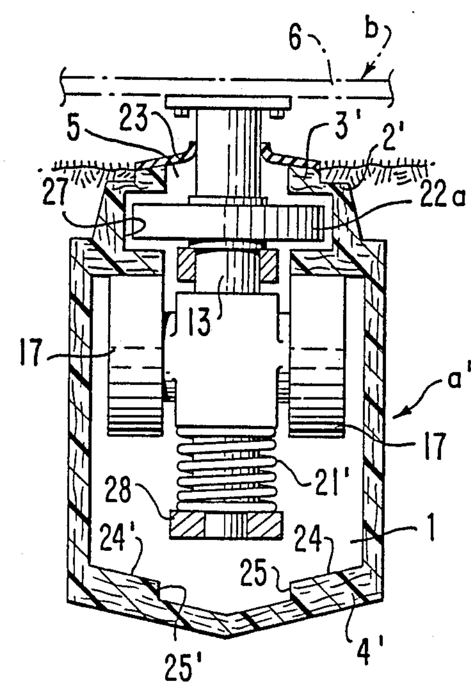

FIGS. 6 to 8 show a second embodiment of the present invention, wherein bottom wall 4' of rail a' is substantially V-shaped in cross section, i.e. with a larger depth at a central portion. Thus, the inner upper surface of lower wall 4', rather than being horizontal as in the embodiment of FIGS. 1–5, is formed by two inwardly and downwardly convergent inclined surfaces 24, 24', and wheels 14' have a complementary configuration. Additionally, the bottom wall 4' has therein a downwardly extending stepped recess including stepped surfaces 25, 25'. Wheels 14' also have circumferential flanges 26 extending radially outwardly and contacting surfaces 25, 25'. Further in this embodiment, the support structure includes a frame 28 mounted on vertical shaft 13. Wheels 14' are provided in pairs at forward and rearward portions of frame 28. Rollers 17 are rotatably mounted on a boss 33 which is slidably mounted on vertical shaft 13. A spring 21' operates between frame 28 and boss 33 to bias the boss 33 upwardly along vertical shaft 13 with respect to the frame and thereby to urge rollers 17 upwardly into contact with the inner lower surfaces of upper walls 2' of the rail. Also in this embodiment, the mouth portions 3' of the rail have formed therein laterally extending guide recesses 27, and a guide roller 22a is rotatably mounted on shaft 13 to contact inner vertical surfaces of recesses 27. Thus, in this embodiment the guiding of the cart is achieved by the contact of roller 22a with vertical surfaces of the rail, and also by contact of flanges 26 with vertical surfaces 25, 25' of the rail.

Wheels 14' are driven by a suitable motor (not shown), drive chain 32, sprocket wheel 30, drive chain 31 and sprockets 29, 29'.

Figure 9:
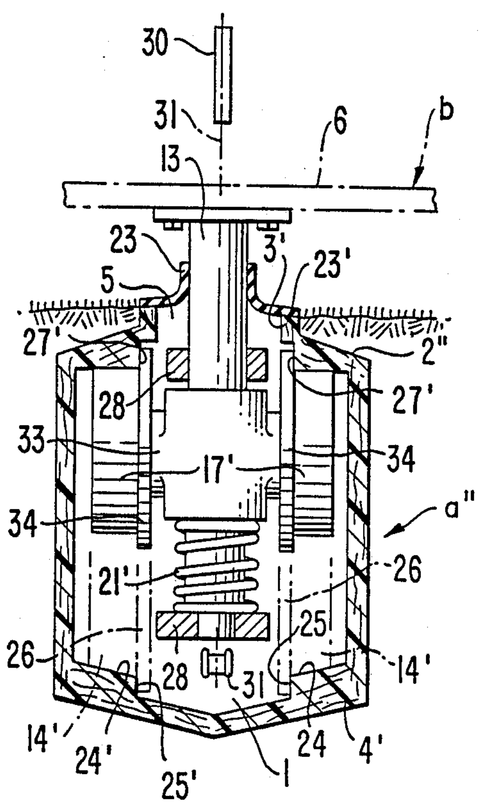
FIG. 9 is a view similar to FIG. 8 but of a third embodiment of the present invention.

FIG. 9 illustrates a third embodiment of the present invention which is a modification of the embodiment of FIGS. 6–8. Thus, in FIG. 9 the guide roller 22a is replaced by circumferential flanges 34 extending radially outwardly from rollers 17' and contacting surfaces 27' of stepped recesses formed in the inner edges of the upper walls 2" of the rail a". The embodiment of FIG. 9 otherwise is the same as the embodiment of FIGS. 6–8.

FIGS. 10 through 14 illustrate a fourth embodiment of the present invention. In this embodiment the inner lower surfaces of upper walls 2''' of the rail comprise inwardly and upwardly convergent inclined surfaces, and rollers 17" have a complementary configuration. Rollers 17" also have circumferential flanges 34' contacting vertical surfaces 27" of stepped recesses formed in the inner edges of the upper walls 2'''of the rail, thereby improving guiding of the cart.

Figure 10:
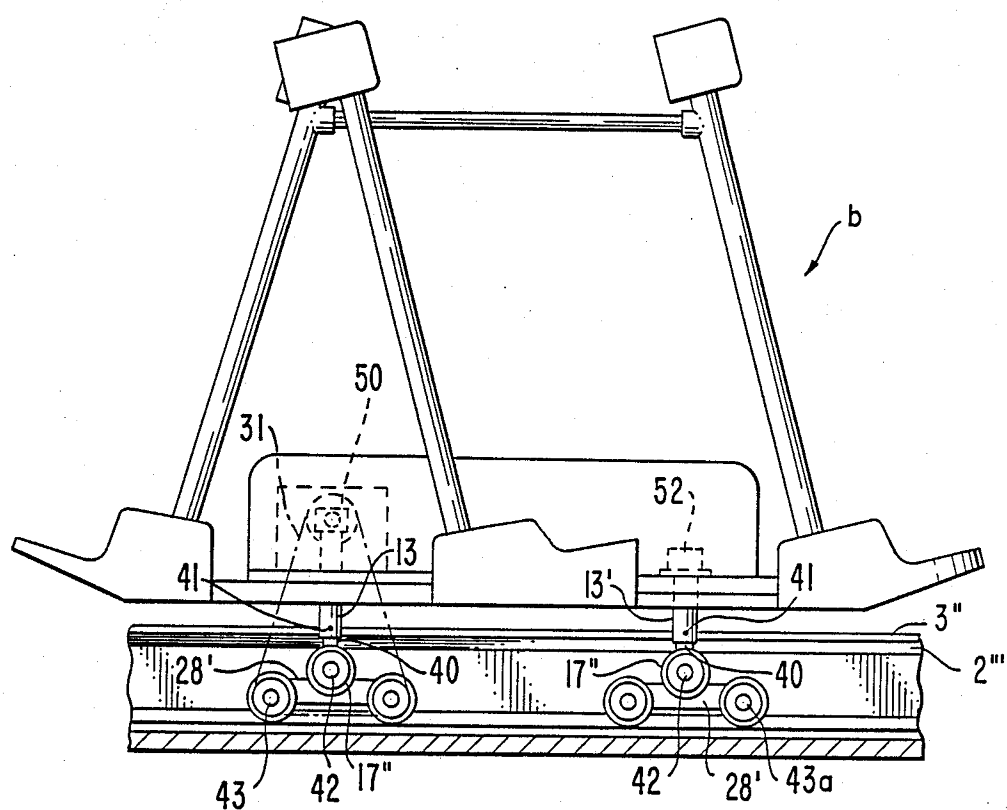
FIG. 10 is a view similar to FIG. 1, but of a fourth embodiment of the present invention.
Figure 11:
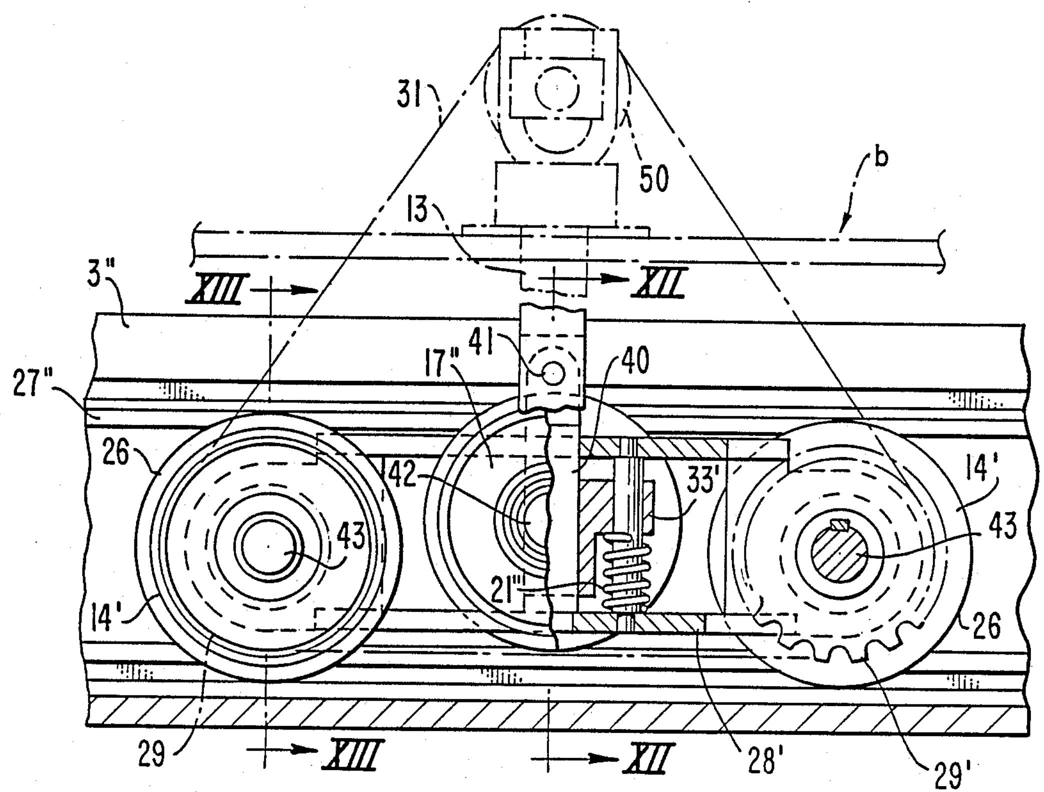
FIG. 11 is a view similar to FIG. 6, but of a driving wheel assembly portion of the embodiment of FIG. 10.

Further in this embodiment, one group or plurality of wheels 14', i.e. the left wheels shown in FIG. 10, are driven by a motor 50 and a transmission system including chain 31 and sprocket wheels 29, 29', in a manner similar to that of the embodiment of FIGS. 6–8. Another plurality or group of wheels, i.e. the wheels shown on the right side of FIG. 10, are not positively driven, but rather are freely rotatable and are mounted turnably in a manner to be discussed in more detail below. The driven wheels 14', and rollers 17" are shown in more detail in FIGS. 11 through 13. Thus, the support structure includes the vertical connecting shaft 13 mounted at an upper end thereof to cart b. In this embodiment however, a supporting shaft 40 is pivoted at an upper end thereof to a lower end of shaft 13 by a pivot pin 41. Frame 28' is fixed to shaft 40, and pairs of wheels 14' are rotatably mounted about shafts 43 at forward and rearward portions of frame 33'. Boss 28' is slidably mounted on supporting shaft 40 and rotatably supports rollers 17" around shaft 42. A spring 21" biases boss, 33' upwardly along supporting shaft 40 with respect to the frame and thereby urges rollers 17" upwardly into contact with the inner lower surfaces of upper walls 2'''. The pivotal mounting achieved by pin 41 allows the wheels 14' and rollers 17" to always be maintained in contact with their respective rail surfaces.

The motor 50 may be a reversible motor mounted on the body of the cart b.

Figure 14:
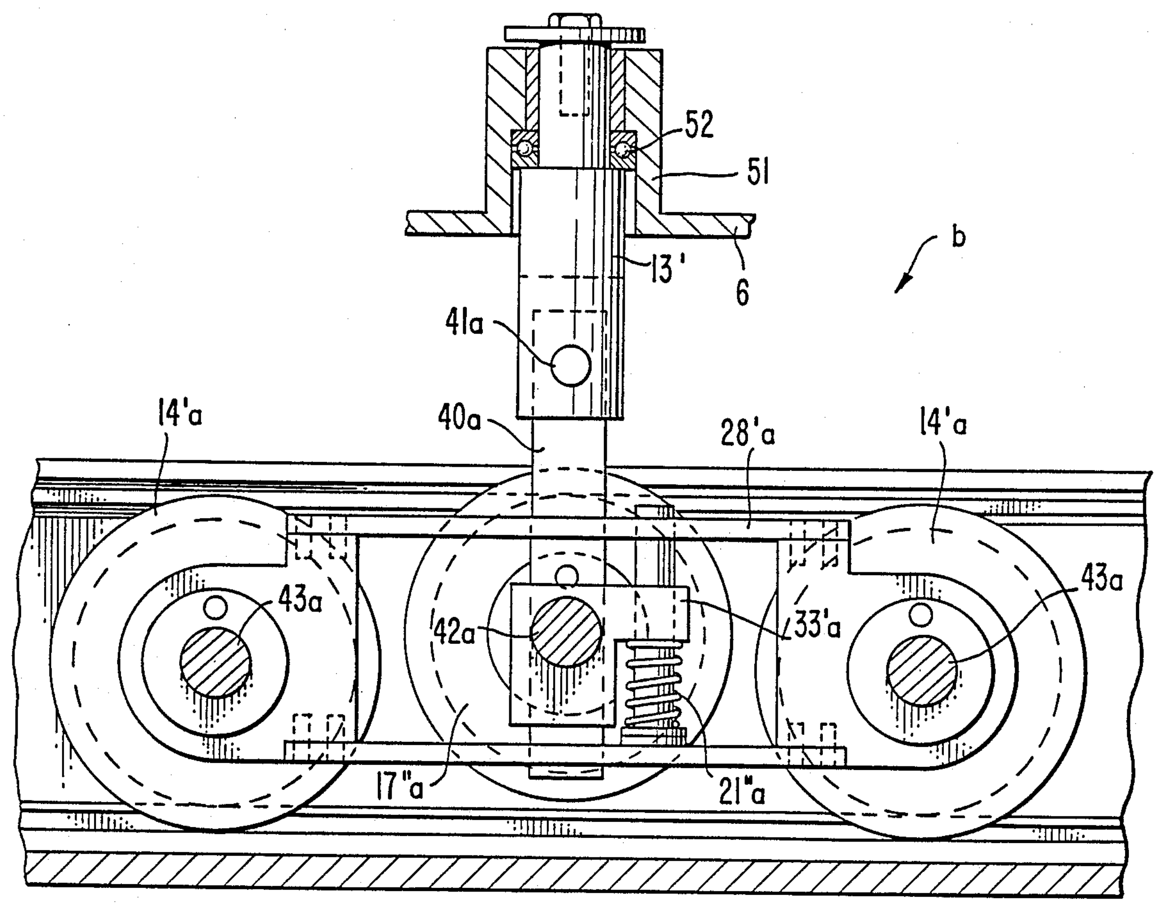
FIG. 14 is a view similar to FIG. 11, but of a non-driven wheel assembly thereof.

The arrangement of the nondriven wheels at the other end of the cart substantially has the same structure as the arrangement of the driven wheels described above with reference to FIG. 11. However, the nondriven wheel arrangement, shown in FIG. 14, is mounted in a manner to be turnable during movement of the cart along laterally curved portions of the rail. Thus, vertical connecting shaft 13' is mounted in a housing 51 of body 6 of cart b by means of a thrust bearing 52 so that shaft 13' and structure connected thereto are rotatable about the axis of shaft 13'. Thus, a second supporting shaft **40*a* is pivoted about a pin 41*a* to a lower end of shaft 13'. A second frame 28'*a* is fixed to second supporting shaft 40*a* and rotatably supports freely rotatable wheels 14'*a*. These wheels are not driven, but rather are caused to rotate by movement of the cart along the rail. A second boss 33'*a* is slidably mounted on second supporting shaft 40*a* and rotatably supports further, rollers 17"*a*. A second spring 21"*a* biases second boss 33'*a* upwardly along second supporting shaft 40*a* with respect to the second frame and thereby urges rollers 17"*a* upwardly into contact with the inner lower surfaces of upper walls 2''' of the rails. As a result of this structure, during operation of motor 50 to rotate wheels 14' shown in FIG. 11 and thereby to move cart b along the rail, contact between the rail and freely rotatable wheels 14'*a* causes rotation of such wheels. Additionally, due to the rotatable mounting of shaft 13', during movement of the cart along laterally curved portions of the rail, shaft 13' is capable of a necessary degree of rotation about its axis with respect to the cart. This is achieved by corresponding rotation of the unit formed by shaft 40*a*, frame 28'*a*, wheels 14'*a*, boss 33'*a* and rollers 17"*a***.

The embodiment of FIGS. 10 through 14 otherwise operates generally in the same manner as the previously described embodiments of the present invention, and it is to be understood that the above discussed novel features of the embodiment of FIGS. 10–14 may be incorporated with other features of the present invention disclosed in the earlier described embodiments thereof.

Figure 12:
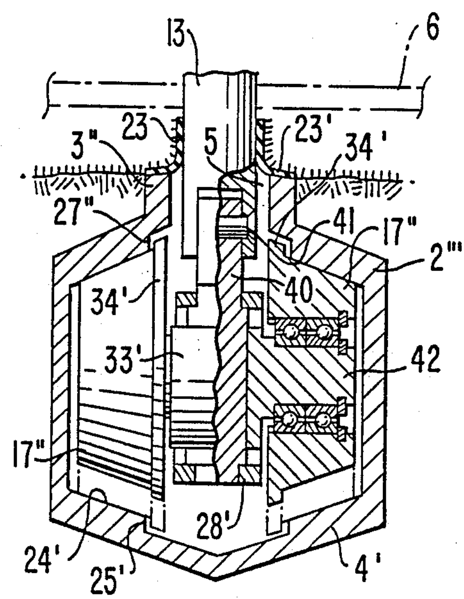
FIGS. 12 and 13 are views similar to FIGS. 8 and 7, respectively, but of the embodiment of FIG. 10.
Figure 13:
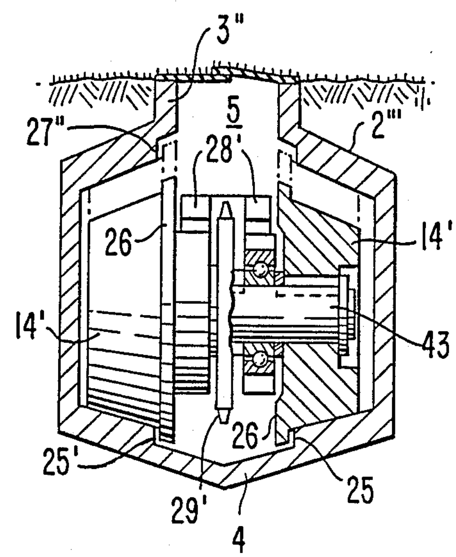

A further feature of the present invention will be apparent from a consideration particularly of FIGS. 12 and 13. Thus, dust, dirt and sand may enter the bottom portion of the rail and become accumulate therein. To remove such debris, it is possible to move a vacuum cleaner automatically along the interior of the rail. The debris will be collected in the bottom, V-shaped recess in the rail. Additionally, any water which enters the rail will be collected in the bottom recess and may be discharged therefrom, for example via a water collecting tank provided in a sunken portion of the ground. This type of cleaning arrangement will ensure smooth and stable operation of the system.

Figure 15:
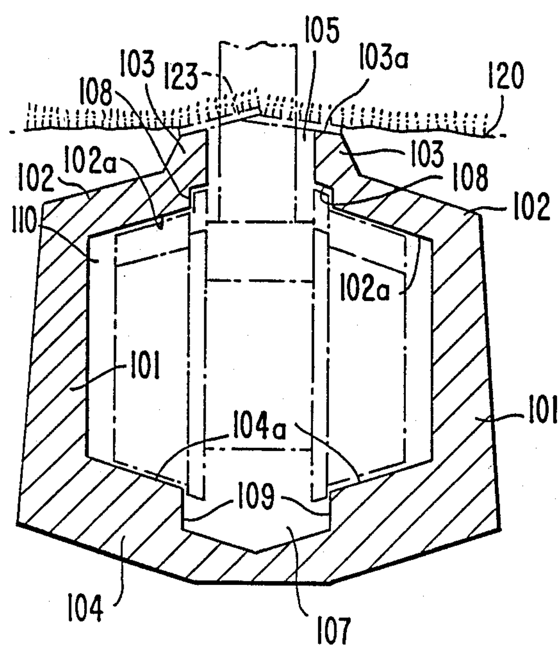
FIG. 15 is a transverse section of a particularly preferred construction of a rail according to the present invention.
Figure 16:
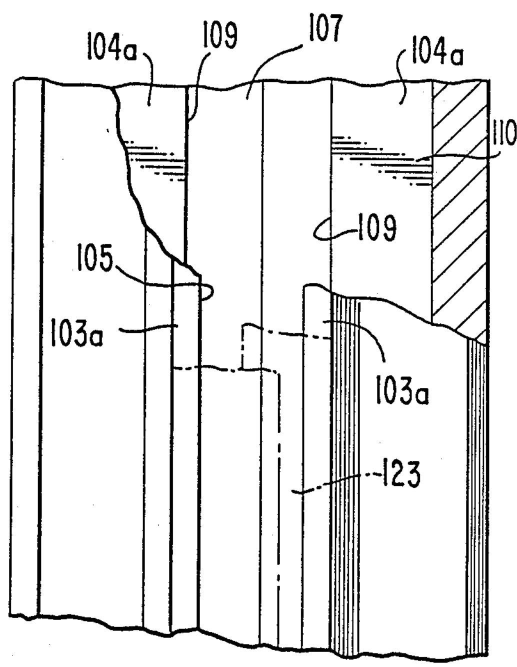
FIG. 16 is a plan view of the rail of FIG. 15.

FIGS. 15 and 16 illustrate a particularly preferred configuration of the rail of the present invention, suitable for various of the above embodiments of the present invention. It will be apparent that the rail of FIGS. 15 and 16 is particularly suitable for the embodiment of the system of the present invention described above and illustrated in FIGS. 10 through 14.

Thus, the rail of FIGS. 15 and 16 is formed by joining a plurality of channel members of an appropriate length, for example from 1 to 4 m, for ease in handling. The end faces of such channel member may be transverse or slightly angled. The channel member has a transverse cross section shown in FIG. 15 defined by spaced side walls 101 joined at lower ends thereof by a bottom wall 104. The side walls 101 have at upper ends thereof upper walls 102 extending inwardly toward each other. The upper walls 102 have spaced inner edges having extending upwardly therefrom mouth portions 103. The inner edges of the upper walls 102 and the mouth portions 103 define therebetween a longitudinal groove 105. The bottom wall 104 has an inner upper contour defined by two inwardly and downwardly convergent inclined surfaces **104*a*. The upper walls 102 have inner lower contours defined by respective inwardly and upwardly convergent inclined surfaces 102*a*. The inclined surfaces 104*a* of the bottom wall and the inclined surfaces 102*a* of the upper walls, as well as inner surfaces of side walls 101 define within the channel member a longitudinal channel 110 having a generally hexagonal transverse cross section and connected upwardly to longitudinal groove 105**.

The width of the groove 105 is no more than approximately 35 mm, for example, so that a small golf ball will not pass therethrough. The hexagonal channel 110 has a width, as well as a height, of approximately 100 to 130 mm. When the rail is embedded in the earth, upper surfaces **103*a* of mouth portions 103 are exposed, and these exposed surfaces have a width of only about 10 mm. As a result, the total width of the portion of the rail exposed above the ground surface, including the width of groove 105**, is no more than approximately 50 to 60 mm.

A longitudinal recess 107 is formed in the bottom wall 104 between the two inclined surfaces **104*a* thereof, recess 107 being defined by stepped surfaces 109 extending downwardly from respective inclined surfaces 104*a*. As a result, water or debris entering channel 110 will be collected in recess 107**.

Additionally, stepped recesses 108 are formed in the inner edges of upper walls 102.

The rail is embedded in the fairway of a golf course to extend therealong with exposed surfaces **103*a* and the upper edge of gap 105 flush with ground surface 120, as shown generally in FIG. 15. When the rail extends rectilinearly, the channel members will have transverse or perpendicular end faces. When the rail curves, the channel members may have end faces angled corresponding to the magnitude of curvature. Cosmetic flexible members 123, as described above, may be attached to exposed surfaces 103*a* to normally cover groove 105. The phantom lines in FIG. 15 illustrate the various shafts, wheels, rollers and flanges of the present invention described above particularly with reference to the embodiment of FIGS. 10–14, and the operation thereof with respect to the rail of FIG. 15** will be apparent.

Furthermore, when a cart passing along the rail of FIGS. 15 and 16 moves along a steep grade, it is possible to provide a tow rope within the rail of the present invention. This is advantageous on steep slopes and in the case of a heavily loaded cart or other vehicle.

The rail of FIGS. 15 and 16 may be formed of any desired material, for example a suitable metal. It particularly is preferred however to form the rail of a plastic material having high strength and light weight, for example a fiber reinforced plastic material or a resin concrete. As will be apparent from FIG. 15, the interior configuration of the rail is substantially the shape of a hexagon. The exterior configuration of the rail can be approximately the same or can be modified as desired, for example in the manner illustrated in FIG. 15. A particularly important feature of the present invention, as mentioned previously, is the fact that only the bottom wall 104 need be made of a configuration and structure to withstand very great loads, since the entire weight of the cart is borne by the lower wall. The upper walls of the rail will bear the force of the rollers operating to prevent the cart from falling over and must be formed accordingly. However, the side walls and particularly the mouth portions of the rails can be made as thin as possible as long as they maintain their shape. This makes it possible to reduce the amount of the rail exposed to the ground surface, and this is a significant advantage.

Although the present invention has been described and illustrated with respect to preferred embodiments thereof, it will be understood that various modifications and changes as will be apparent to those skilled in the art may be made and further that various combinations of the features described and illustrated with respect to specific embodiments may be combined.

I claim:

1. A golf cart system comprising:

a longitudinal rail to be implanted in the terrain of a golf course and formed by a plurality of channel members;

each said channel member having a transverse cross section defined by spaced side walls joined at lower ends thereof by a bottom wall having an inner upper surface, said side walls having at upper end thereof upper walls extending inwardly toward each other and having inner lower surfaces, said upper walls having spaced inner edges having extending upwardly therefrom mouth portions, and said inner edges and said mouth portions defining therebetween a longitudinal groove opening downwardly into the interior of said rail, said inner upper surface of said rail lower wall being formed by two inwardly and downwardly convergent inclined surfaces, and said inner lower surfaces of said rail upper walls comprising inwardly and upwardly convergent inclined surfaces, and said inclined surfaces of said bottom and upper walls as well a inner surfaces of said side walls defining within said channel member a longitudinal channel having a generally hexagonal transverse cross section;

a golf cart to be moved along said rail;

support means mounted on said cart and extending downwardly therefrom through said longitudinal groove, said support means comprising at least one vertical shaft and a frame mounted on said vertical shaft;

at least two pairs of wheels mounted on said frame within said rail interior at positions forwardly and rearwardly with respect to said vertical shaft, each said pair including two wheels rollingly contacting respective said inner upper surfaces of said rail bottom wall;

means supported by said cart for rotating at least some of said wheels for thereby moving said cart along said rail; and means for preventing said cart from falling sideways from said rail and comprising a pair of rollers supported by said frame between said two pairs of wheels and positioned within said rail interior, each of said rollers contacting a said inner lower surface of a respective said rail upper wall.

2. A system as claimed in claim 1, further comprising means for biasing said rollers upwardly into contact with said inner lower surfaces of said rail upper walls.

3. A system as claimed in claim 1, wherein said preventing means furthers comprises guide means contacting vertical surfaces of said rail.

4. A system as claimed in claim 3, wherein said guide means comprise circumferential flanges extending radially outwardly from said rollers and contacting surfaces of stepped recesses formed in said inner edges of said rail upper walls.

5. A system as claimed in claim 3, wherein said guide means comprise circumferential flanges extending radially outwardly from said wheels and contacting surfaces of a stepped recess formed in said inner upper surface of said rail bottom wall.

6. A system as claimed in claim 1, wherein said rollers are mounted on a boss which is slidably mounted on said vertical shaft, and further comprising spring means for biasing said boss upwardly along said vertical shaft with respect to said frame and thereby for urging said rollers upwardly into contact with said inner lower surfaces of said rail upper walls.

7. A system as claimed in claim 6, wherein said rotating means comprises a motor mounted on said cart, and a transmission system operatively connecting said motor and said wheels.

8. A system as claimed in claim 1, wherein said vertical shaft comprises a connecting shaft mounted at an upper end thereof to said cart and a supporting shaft pivoted at an upper end thereof to a lower end of said connecting shaft, said frame is mounted on said supporting shaft and rotatably supports said wheels, and further comprising a boss slidably mounted on said supporting shaft and rotatably supporting said rollers, and spring means for biasing said boss upwardly along said supporting shaft with respect to said frame and thereby for urging said rollers upwardly into connect with said inner lower surfaces of said rail upper walls.

9. A system as claimed in claim 8, wherein said first-mentioned support means and said rollers and wheels supported thereby are located adjacent a first longitudinal end of said cart, and further comprising means for turnably mounting freely rotatable said wheels adjacent a second longitudinal end of said cart.

10. A system as claimed in claim 9, wherein said mounting means comprises a second connecting shaft, means for supporting an upper end of said second connecting shaft on said cart for rotation about the axis of said second connecting shaft, a second supporting shaft pivoted at an upper end thereof to a lower end of said second connecting shaft, a second frame mounted on said second supporting shaft and rotatably supporting said freely rotatable wheels, a second boss slidably mounted on said second supporting shaft and rotatably supporting further said rollers, and second spring means for biasing said second boss upwardly along said second supporting shaft with respect to said second frame and thereby for urging said further rollers upwardly into contact with said inner lower surfaces of said rail upper walls, whereby operation of said rotating means rotates said first-mentioned wheels and thereby moves said cart along said rail, during which contact between said rail and said freely rotatable wheels causes rotation of said freely rotatable wheels, and whereby, during movement of said cart along laterally curved portions of said rail, said rotatable support of said second connecting shaft by said cart enables turning of said second connecting shaft, said second supporting shaft, said second frame, said freely rotatable wheels, said second boss and said further rollers about said axis of said second connecting shaft with respect to said cart.

11. A rail to be implanted in the terrain of a golf course to enable the passage therealong of a golf cart, said rail being formed by a plurality of channel elements each comprising:

a transverse cross section defined by spaced side walls joined at lower ends thereof by a bottom wall, said side walls having at upper ends thereof upper walls extending inwardly toward each other, said upper walls having spaced inner edges having extending upwardly therefrom mouth portions, and said inner edges and said mouth portions defining therebetween a longitudinal groove forming means for the passage therethrough of a vertical shaft of a golf cart passing along said rail;

said bottom wall having an inner upper contour defined by two inwardly and downwardly convergent inclined surfaces forming means for supporting respective golf cart wheels mounted on the golf cart vertical shaft;

said upper walls having inner lower contours defined by respective inwardly and upwardly convergent inclined surfaces forming means to be contacted by respective rollers mounted on the golf cart vertical shaft; and said inclined surfaces of said bottom and upper walls and inner surfaces of said side walls defining within said channel member a longitudinal channel having a generally hexagonal transverse cross section and connected upwardly to said longitudinal groove.

12. A rail as claimed in claim 11, further comprising a longitudinal recess formed in said bottom wall between said two inclined surfaces thereof, said recess being defined by steps extending downwardly from respective said inclined surfaces, whereby water and debris entering said channel may be collected in said recess.

13. A rail as claimed in claim 11, further comprising stepped recesses formed in said inner edges of said upper walls.

* * * * *